United States Patent [19]

Strem

[11] 4,239,544

[45] Dec. 16, 1980

[54] JET DROP PRINTING INK COMPOSITION

[75] Inventor: Joseph G. Strem, Dayton, Ohio

[73] Assignee: The Mead Corporation, Dayton, Ohio

[21] Appl. No.: 32,082

[22] Filed: Apr. 23, 1979

[51] Int. Cl.³ .............................................. C09D 11/02
[52] U.S. Cl. ..................................................... 106/22
[58] Field of Search .................... 106/22, 20; 260/439, 260/DIG. 38

[56] References Cited

U.S. PATENT DOCUMENTS

| | | | |
|---|---|---|---|
| 2,092,750 | 9/1937 | Brizzolara et al. | 260/439 |
| 2,155,862 | 4/1939 | Hughes | 106/22 |
| 2,259,641 | 10/1941 | Horning | 260/439 |
| 2,586,570 | 2/1952 | Skiles | 106/22 |
| 2,752,254 | 6/1956 | Drautz | 106/14.5 |
| 3,525,630 | 8/1970 | Phillips | 106/21 |
| 3,705,043 | 12/1972 | Zabiak | 106/22 |
| 3,805,273 | 4/1974 | Brady et al. | 346/75 |
| 3,846,141 | 11/1974 | Ostergren et al. | 106/22 |
| 3,870,528 | 3/1975 | Edds et al. | 106/31 |
| 3,889,271 | 6/1975 | Freytag | 346/1 |
| 3,903,034 | 9/1975 | Zabiak et al. | 260/29.6 WB |
| 3,994,736 | 11/1976 | Hertz | 106/22 |
| 3,996,176 | 12/1976 | Haus et al. | 260/29.6 R |
| 4,024,096 | 5/1977 | Wachtel | 260/29.3 |

OTHER PUBLICATIONS

Offenlegungsschrift, 27 39 784, Mar. 15, 1979, E. Loock.

*Primary Examiner*—Theodore Morris
*Attorney, Agent, or Firm*—Biebel, French & Nauman

[57] ABSTRACT

A nonagglomerating, nonsettling, optical character readable jet drop printing ink of a mixture of C. I. Acid Green 1, C. I. Acid Blue 9, and C. I. Acid Red 73 dyes. The ink composition is infrared absorbent and visually black to the eye.

6 Claims, No Drawings

JET DROP PRINTING INK COMPOSITION

BACKGROUND OF THE INVENTION

This invention relates to printing inks and more particularly to infrared absorptive printing inks suitable for use in jet drop printers of the type disclosed in Brady et al, U.S. Pat. No. 3,805,273. In ink jet drop printing, a liquid ink is forced through a very small diameter orifice, normally in the range of 0.002 in. to 0.005 in., to form a stream of uniformly-sized, spaced spherical droplets. The droplets are formed at the rate of about 50,000 per second through each of 500 or more orifices in a manifold assembly. The stream of droplets is then directed, usually by electrical means which selectively charge the drops, onto the surface of a fast moving web, such as paper, where the stream forms printed characters in response an electronic character generator which controls the electrical charging and directing means.

As can be seen from the above description, the ink used in jet drop printing must possess a unique combination of properties. The ink must be electrically conductive, having a resistivity below about 1000 ohm-cm. and preferably below about 500 ohm-cm. It must have a workable viscosity in the range of about 1 to 10 centipose at 25° C. and must be free of all but the smallest particulate matter to prevent plugging of the orifices. The ink should be stable over long periods of time, compatible with the materials used to make up the manifold assembly, free of living organisms, and, after printing, smear resistant, fast drying, and waterproof when dry.

Additionally, in systems where the printing must be capable of being read by automated optical character readers (OCRs) operating in the infrared range of about 7,000 to 11,000 angstroms, jet drop printing inks must also possess the property of being infrared absorptive while at the same time possess the capability of being readable by the human eye. Generally speaking, people are accustomed to reading printing which appears visually to be black. Thus, it is highly desirable that OCR readable jet drop printing inks be black as well as infrared absorptive. It is for this reason that although certain green dyes have known infrared absorbing characteristics, the prior art jet drop printing inks have generally utilized water soluble nigrosine black dyes.

Typical of such nigrosine dye ink compositions for use in jet drop printing are Zabiak, U.S. Pat. No. 3,705,043, and Edds et al, U.S. Pat. No. 3,870,528. Although nigrosine dyes are black to the eye and are infrared absorptive, they tend to agglomerate and are difficult to maintain in suspension for extended periods of time. As taught by Edds et al., there are solvents which, when added to the nigrosine compositions, appear to alleviate the agglomeration problem for jet drop printers which have only a relatively few orifices. However, such inks have not been fully satisfactory in printers of the type disclosed by Brady et al.

Accordingly, the need exists for an improved jet drop printing ink which is infrared absorbing at wave lengths utilized by optical character readers and appears visually black to the human eye.

SUMMARY OF THE INVENTION

This invention provides an improved infrared absorptive jet drop printing ink for use in multiple orifice printers which avoids the problems encountered in using prior art nigrosine dyes. This result is accomplished by using a combination of acid dyes, including the previously avoided infrared absorbing green dyes, which, when mixed in the proper proportions, produce an ink which is visually black and is OCR readable.

The acid dyes suitable for use in this invention comprise C.I. Acid Green 1, C.I. Acid Blue 9, and C.I. Acid Red 73. The Acid Green 1 dye provides the desired infrared absorbing properties which render the ink OCR readable. When mixed together in the proper proportions, the three dyes form a water base ink which is visually black.

To minimize loss of water during long periods of operation it is preferred that there be added a small amount (about 1 percent by weight) of a humectant. Preferably, the ink formulation also includes a preservative to inhibit growth of bacteria during storage which might otherwise serve to clog the orifices of a jet printer.

Accordingly, it is an object of this invention to provide a water base ink suitable for use in jet drop printers which avoids the problems of prior art nigrosine dyes and yet is visually black and is infrared absorptive. Other objects and advantages of the invention will be apparent from the following description and the appended claims.

DESCRIPTION OF THE PREFERRED EMBODIMENTS

A jet drop printing ink prepared in accordance with this invention comprises a water-based formulation of a mixture of C.I. Acid Green 1, C.I. Acid Blue 9, and C.I. Acid Red 73 dyes. The Acid Green 1 dye provides the desired infrared absorbing properties for the ink, and the mixture of the Acid Green 1, Acid Blue 9, and Acid Red 73 dyes produces an ink which is visually black to the eye.

C.I. Acid Green 1 dye has the C.I. index number 10020 and is strongly absorbent at infrared wavelengths. Its chemical formula is:

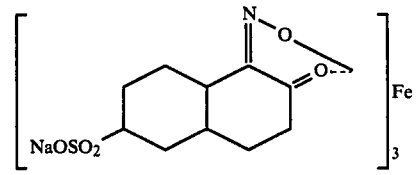

It is commercially available from the American Cyanamid Company under the name Calcocid Naphthol Green B.

C.I. Acid Blue 9 has the C.I. index number 42090. Its chemical formula is:

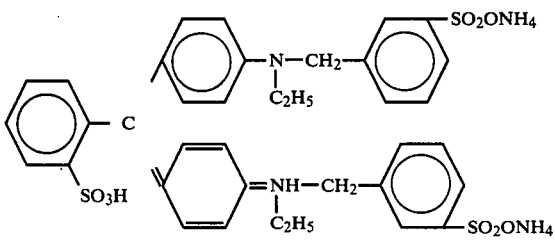

It is commercially available from the American Cyanamid Company under the name Calcocid Blue 2G.

C.I. Acid Red 73 has the C.I. index number 27290. Its chemical formula is:

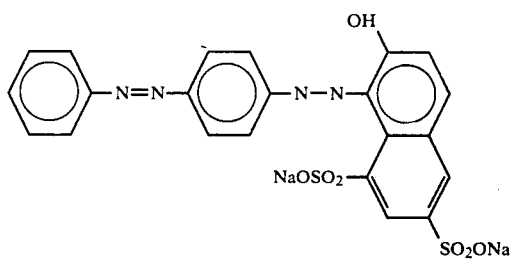

It is available from the American Cyanamid Company under the name Calcocid Scarlet Moo Extra conc.

It is well-known that jet drop printing inks should contain a humectant in order to minimize undesired drying of the ink within the print head. For a printer of the type described in the above mentioned Brady patent, it is common to run a flush fluid through the print head prior to start up and to flush the print head after shutdown. Ordinarily, the ink is not permitted to stand for a long period of time in the print head, and this reduces the problem of ink drying. To further reduce the problem, it has been found that the addition of a humectant such as acetylene glycol added in an amount as small as 1.0 weight percent produces satisfactory results. Other humectants, such as those disclosed in Zabiak, U.S. Pat. No. 3,846,141, as well as other humectants known in the art may also be added.

It is also well-known in the art to add a preservative to ink jet drop printing formulations to inhibit bacterial growth. It has been found that the addition of about 1 percent by weight of a 10 percent solution of 6-acetoxy-2,4, dimethyl dioxane produces satisfactory results. 6-acetoxy-2,4, dimethyl dioxane is available from the Givaudan Corporation under the name GIV-GARD DXN.

In formulating the jet drop ink of the present invention C.I. Acid Green 1, C.I. Acid Blue 9, and C.I. Acid Red 73 are preferably added to water in the ratio, by weight percent, of 3.8 to 2.2 to 1, respectively A humectant and a preservative are also preferably added and the pH of the formulation adjusted to about 7.5. The formulation is filtered through successively smaller filters, finally passing through a 1.2 micron filter. The ink composition produced is suitable for use in jet drop printers, is visually black to the eye, and also possesses infrared absorbing characteristics which make it OCR readable. It is also nonagglomerating and nonsettling in use.

The following example ilustrates the invention, all percentages being given by weight.

EXAMPLE 1

In a container of water at room temperature, 10 percent acetylene glycol is added with stirring. 3.8 percent Calcocid Naphthol Green B, 2.2 percent Calcocid Blue 2G, and 1.0 percent Crocein Scarlet Moo Extract are then dissolved into the glycol-water mixture. The dye solution is heated to 60° C. and kept at that temperature for 2 hours. After cooling the solution to room temperature, 1.0 percent of a 10 percent filtered solution of GIV-GARD DXN is added with stirring, the pH is adjusted to about 7.5±0.2, and make up water is added to bring the solution up to 91 percent water. The ink composition is then filtered successively through 10 micron, 5 micron, and 1.2 micron filters. The resulting ink composition has a specific resistivity of less than 50, a specific gravity of 1.026, a viscosity of 1.12 centipoise, and a surface tension of 46.6 dynes/cm. at 21° C.

While the compositon and method herein described constitute a preferred embodiment of the invention, it is to be understood that the invention is not limited to this precise composition and method and that changes may be made therein without departing from the scope of the invention which is defined in the appended claims.

What is claimed is:

1. A jet drop printing ink comprising:
about 3.8 weight percent of a dye having the chemical formula

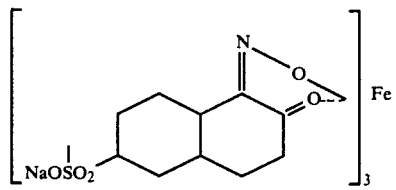

about 2.2. weight percent of a dye having the chemical formula

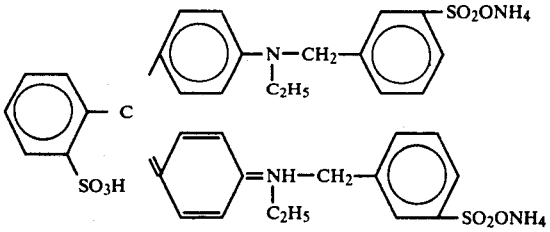

about 1.0 weight percent of a dye having the chemical formula

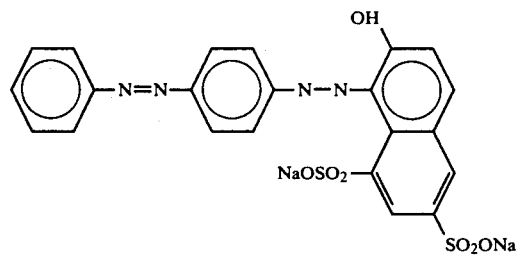

and balance water, said ink being infrared absorbent at wavelengths utilized by optical character readers and appearing visually black to the human eye.

2. The ink of claim 1 where the pH of the ink is adjusted to a range of about 7.3 to 7.7.

3. The ink of claim 2 further including a humectant.

4. The ink of claim 3 wherein said humectant comprises
about 1.0 weight percent acetylene glycol.

5. The ink of claim 4 further including a preservative.

6. The ink of claim 5 wherein said preservative comprises
about 1.0 weight percent 6-acetoxy-2,4, di-methyl dioxane.

* * * * *